United States Patent
Landt et al.

(10) Patent No.: US 7,791,481 B2
(45) Date of Patent: Sep. 7, 2010

(54) LIGHT ACTIVATED RFID TAG

(75) Inventors: Jeremy Landt, Santa Fe, NM (US);
Matthew Burnett, Albuquerque, NM (US); Tai Youn, Albuquerque, NM (US);
Kelly Gravelle, Poway, CA (US);
Charles A Johnson, Albuquerque, NM (US)

(73) Assignee: TC License Ltd., Hummelstown, PA (US)

( * ) Notice: Subject to any disclaimer, the term of this patent is extended or adjusted under 35 U.S.C. 154(b) by 338 days.

(21) Appl. No.: 12/017,166

(22) Filed: Jan. 21, 2008

(65) Prior Publication Data

US 2008/0174436 A1   Jul. 24, 2008

Related U.S. Application Data

(60) Provisional application No. 60/881,519, filed on Jan. 22, 2007.

(51) Int. Cl.
*G08B 13/14* (2006.01)
(52) U.S. Cl. .................................. 340/572.1
(58) Field of Classification Search ... 340/572.1–572.9, 340/10.1
See application file for complete search history.

(56) References Cited

U.S. PATENT DOCUMENTS

| 4,114,151 | A | 9/1978 | Denne |
| 5,528,222 | A | 6/1996 | Moskowitz et al. |
| 6,121,880 | A | 9/2000 | Scott et al. |
| 6,275,157 | B1 * | 8/2001 | Mays et al. ............... 340/572.5 |
| 6,590,150 | B1 | 7/2003 | Kiefer |
| 6,951,666 | B2 | 10/2005 | Kodas et al. |
| 7,053,294 | B2 | 5/2006 | Tuttle et al. |
| 7,070,112 | B2 | 7/2006 | Beenau et al. |
| 7,098,085 | B2 | 8/2006 | Yamanaka et al. |
| 7,098,394 | B2 | 8/2006 | Armer et al. |
| 7,123,204 | B2 | 10/2006 | Forster et al. |
| 7,135,974 | B2 | 11/2006 | Hernandez et al. |
| 7,158,031 | B2 | 1/2007 | Tuttle |
| 2001/0020897 | A1 | 9/2001 | Takatori et al. |
| 2005/0134462 | A1 | 6/2005 | Shelley |
| 2006/0028344 | A1 * | 2/2006 | Forster .................... 340/572.7 |
| 2007/0205871 | A1 * | 9/2007 | Posamentier ............... 340/10.3 |
| 2008/0018466 | A1 * | 1/2008 | Batra et al. .............. 340/572.1 |
| 2008/0180341 | A1 * | 7/2008 | Cohen ..................... 343/792.5 |

OTHER PUBLICATIONS

International Search Report for PCT/US2008/051591 dated Jun. 16, 2008.

* cited by examiner

*Primary Examiner*—Phung Nguyen
(74) *Attorney, Agent, or Firm*—Ceasar, Rivise, Bernstein, Cohen & Pokotilow, Ltd.

(57) ABSTRACT

A radio frequency identification (RFID) device is arranged for use with a remote interrogator unit. The RFID device comprises an integrated circuit configured to send, in response to a signal received from the remote interrogator unit or automatically, a responsive signal which includes identification information. A communication antenna is electrically coupled to the integrated circuit and is provided for wireless communication with the remote interrogator unit. At least one photovoltaic cell is provided for converting radiation into electrical energy and providing power to the integrated circuit. The photocell may be designed to form all or part of the RF antenna of the RFID device.

29 Claims, 7 Drawing Sheets

LIGHT ACTIVATED RFID TAG

RELATED APPLICATIONS

This application claims priority to U.S. Provisional Application No. 60/881,519 filed Jan. 22, 2007, titled "Light-Activated RFID Tag."

FIELD OF THE INVENTION

The present invention relates to radio frequency identification (RFID) tags, and more particularly, to an RFID tag wherein power is supplied by conversion of light radiation, e.g., natural or artificial, to direct current (DC) energy using photovoltaic cells, e.g., solar cells.

BACKGROUND OF INVENTION

RFID (radio frequency identification) is an automatic identification technology whereby digital data encoded in an RFID tag is captured by a reader using radio waves. RFID tags consist of an integrated circuit (IC) attached to an antenna, plus some protective packaging (like a plastic card) as determined by the application requirements. Tags also sometimes are called "transponders." Data is stored in the integrated circuit and sent through the antenna to a reader. Prior art RFID tags are either "passive" (no battery), "semi-passive" or "active."

Passive RFID tags rely entirely on the reader as their power source. In passive systems, the tag is composed of an antenna and a silicon chip that includes basic modulation circuitry and non-volatile memory. A known technique for communicating with RFID transponders is referred to as "backscatter modulation," whereby the RFID tags send stored data by modulating the impedance attached to their antenna to reflect varying amounts of an electromagnetic field generated by the RFID reader. An advantage of this communication technique is that the RFID transponders or tags can operate automatically at the frequency of the energizing electromagnetic field, and as a result, the reader may operate at multiple frequencies so as to avoid radio frequency (RF) interference, such as using frequency hopping spread spectrum modulation techniques. The RFID tags may extract their power from the energizing electromagnetic field, thereby eliminating the need for a separate power source. This is also referred to as energy harvesting.

Typically, each RFID tag has an individual code containing information related to and identifying the object associated with the tag. In operation, the reader sends an RF signal to the remote transponder. An antenna at the transponder receives the signal from the reader, backscatter modulates the received signal with data temporarily or permanently stored in the transponder (such as data indicating the identity and contents of the object to which the transponder is attached), thereby producing a sequence of signals in accordance with the transponder's individual code, and reflects this modulated signal back to the reader in order to pass the information contained in the transponder memory to the reader. The reader decodes these signals to obtain the information from the transponder.

Active and semi-passive RFID tags use internal batteries to power their circuits. An active tag also uses its battery to broadcast radio waves to a reader, whereas a semi-passive tag relies on the reader to supply the radio signal for the tag to backscatter. The battery is used to boost the effective operating range of the tag and to support additional features over passive tags, such as operation with lower radio signal strengths and sensing operations that require continuous power. Data collected from tags is then passed through communication interfaces (cable or wireless) to host computer systems and passed to computer systems for interpretation, storage, and action. Alternatively, tag power may be supplied externally, e.g., by means of a car battery.

RFID tags can be read-only (stored data can be programmed and read but not changed remotely), read/write (stored data can be altered or rewritten at a distance), or a combination, in which some data is permanently stored while other memory is left accessible for modification or updating as desired.

RFID tags also include a clocking circuit to enable data to be read and sent to a modulation circuit also located on the tag. A data encoder, also located on the RFID tag retrieves data from the IC chip's data array or memory and sends it to a modulation circuit. Data encoding refers to the process of altering the data bit stream between the time it is retrieved from the RFID's memory and its transmission back to the reader. The various encoding algorithms include NRZ (Non-Return to Zero) Direct; FM0; frequency shift keying; Differential Biphase; Biphase L (Manchester), and others. For an RFID tag of the read/write variety, the tag circuitry includes a memory, a clock, a modulation detector, a data decoder, as well as a means for error detection and circuitry for control and for writing new data into the memory. The reader may also send commands to the tag so that the operations of the tag can be controlled. In addition to reading and writing, additional operations include communication with multiple tags in the field of the reader and selection of special 'groups' of tags. RFID tags, including passive tags, may also perform encryption operations to participate in mutual authentication processes as well as protection of data and prevention of unauthorized operations.

A reader (often referred to as an RFID interrogator) is basically a radio frequency (RF) transmitter and receiver, controlled by a microprocessor or digital signal processor. The reader, using an attached antenna, captures data from the RFID tag, then passes the data to a computer for processing. As with RFID tags, readers come in a wide range of sizes and offer different features. Readers can be affixed in a stationary position or can be portable, including hand-held.

The use of RFID has been widely accepted for tracking and managing movable equipment, vehicles, containers, items in the supply chain and other such applications. Specific examples of common applications are the use of RFID to manage railcar equipment, for electronic toll collection, vehicular access control, electronic vehicle registration, highway traffic monitoring and truck fleet management. These applications usually require an interrogation distance, or range, of tens of meters. For use of radio signals, this range translates into a requirement to use UHF or S-band microwave signals. Traditional RFID tags have been constructed from a handful of components. Operational power was achieved by an attached battery or by rectification of the interrogating RF signal. The battery-powered option permitted longer ranges at the expense of increased cost and a defined limited life. Tags without batteries are of lower cost, essentially unlimited life, but of shorter range.

Developments within the last several years have given rise to RFID tags using a single integrated circuit attached to an antenna and operating in the UHF or S-Bands (typically in the range of 400 MHz to 3 GHz). Without batteries, those newer tags could be made smaller, less expensive, yet high performance in terms of function and memory. Interrogation range is adequate in countries where radio regulations permit sufficient RF power transmission to power the tags. The primary drawbacks of this new generation of RFID tags is that some country's radio regulations do not permit sufficient range, and in countries where higher powers and increased ranges are allowed, the range was adequate but limiting.

SUMMARY OF THE INVENTION

The present invention is for a radio frequency identification (RFID) device wherein power is supplied by conversion of light radiation, e.g., natural or artificial, to direct current (DC) energy using photovoltaic cells, e.g., solar cells. The photovoltaic cell could be used in place of one or more batteries, or in place of RF energy harvesting (rectification of the RF signals sent by the reader), or in combination with either or both of these known sources of energy. The RFID device is arranged for use with a remote interrogator unit, and comprises a circuit (preferably an integrated circuit) configured to send, in response to a signal (either unmodulated or modulated) received from the remote interrogator unit, a responsive signal (containing information to be sent from the tag to the reader) which may include identification information. The tag can store information such as the type and condition of the equipment of interest, fuel levels, time of day, temperature, ownership of the cargo, a manifest, vehicular traveled route information, or any other information that is useful to the operation of the business. This information can be updated as conditions change and subsequent communication with the tags (say, as the rail car travels along a track) can keep human operators apprised of the condition of the cargo, the point of entry of a vehicle in a toll road, the actions intended for the vehicle or object, etc. A communication antenna is electrically coupled to the tag electronic circuit and is provided for wireless communication with the remote interrogator unit.

One or more photovoltaic cells are provided for converting light radiation into electrical energy and providing power to the tag electronic circuit. A tag constructed using a photocell for operational power can have all the attributes and advantages of a traditional passive tag (unlimited life, small size, low cost, etc.) with the increased range of a battery-powered tag, and may be used for high performance transportation applications in countries with severe restrictions on RF power allowed to be sent by the reader.

The preferred photovoltaic cell is constructed using processes involving the application of amorphous silicon to a flexible substrate. Suitable RFID tags for use in connection with the present invention may be provided in a "sticker" format. Such an RFID tag is about the size of a credit card, is thin and flexible, and may be arranged to be mounted on the windshield of a motor vehicle, such as by utilizing adhesives. Older technology solar cells using glass substrates are not attractive to use in conjunction with such "sticker" tags because of cost and an inability to flex without breaking. In accordance with the present invention, the photovoltaic cell may also be used to form all or part of the RF antenna of the tag.

In accordance with the present invention, utilization of the photovoltaic cell in combination with a passive RFID tag will increase the range at which such a tag can be read by the reader. Such utilization will also improve the sensitivity of the RFID tag by at least 20 dB (or better). This may enable the use of otherwise passive RFID tags in countries where limits are placed upon the use of RF power. Utilization of the photovoltaic cell in combination with a passive RFID tag will also increase the RF bandwidth of the broadcast of radio waves from the RFID tag in response to the reader. By utilizing sunlight or artificial light as a source of energy, the RFID tags of the present invention will have a longer life than RFID tags utilizing internal batteries for powering their circuits and/or supplying power for broadcasting.

The RFID tag of the present invention is suitable for handheld use and packaging may be provided for use of the inventive RFID tag in harsh environments, e.g., a hard case. The RFID tag of the present invention may be utilized while remaining compatible with the existing passive and battery-powered RFID systems, using the same CMOS chip for the tag, etc.

There are two classes of protocols for initiating communication between a reader and an RFID tag: "tag talks first (TTF)" and "reader talks first (RTF)." In the RTF system, the tag is dormant and enters a 'ready' or 'standby' state upon obtaining operational DC power (either from a battery or from RF energy harvesting). The reader sends out a query, either continually or triggered by a command from an external input, an automated controller or a sensor, that essentially asks "any RFID tags of my type out there?" Any compatible RFID tag in range is then activated by the reader and responds. A RTF tag may be passive, semi-passive or active. In TTF systems, upon obtaining DC operational power, the RFID tag automatically sends out its message saying, "I'm here; is anyone listening?" This message can be continuous or intermittent. A TTF tag may be passive, semi-passive or active. The message is a modulation of the impedance of the tag antenna for a backscatter tag, and is a transmitted signal for an active tag. When a tag and reader are in proximity, the reader may automatically receive the message from the tag without issuing a command. The RFID tag of the present invention is suitable for either class of protocol. The downlink from the interrogator to the tag commonly uses an amplitude modulated RF signal when sending data to the tag. When reading data from a tag, the interrogator is not sending radio signals if the tag has a transmitter, and is sending unmodulated signals if the tag uses modulated backscatter. It is also possible for a TTF tag to be sent commands to stop sending messages and accept data and further commands from the interrogator.

BRIEF DESCRIPTION OF THE DRAWINGS

FIG. 9 is an enlarged plan view of an alternative antenna that may be utilized as part of the light activated RFID tag of the present invention;

FIG. 10 is an enlarged plan view of an alternative antenna that may be utilized as part of the light activated RFID tag of the present invention; and, FIG. 11 is a graph demonstrating the increased sensitivity of the light activated RFID tag of the present invention over known passive RFID tags.

DETAILED DESCRIPTION OF THE INVENTION

The RFID tag of the present invention is constructed using an electronic circuit, an antenna element, and a power source. Under the preferred embodiment, the electronic circuit is a single CMOS integrated circuit; the power source is a photovoltaic cell; and, the antenna element is constructed using all or part of the photovoltaic cell. Alternatively, the antenna element may be discrete and separate from the photovoltaic cell. The preferred embodiment uses a flexible solar cell, typically using amorphous silicon on a plastic substrate, made on a roll-to-roll process to increase manufacturing capacity and reduce cost.

Solar radiation intensity in direct sunlight is about 1000 watts per square meter at the surface of the earth. The DC power requirements of an RFID chip may be as high as 100 microwatts for some operations such as writing EEPROM data. Thus, with full solar illumination, only a very small collection area is needed even with consideration of the limited efficiency of amorphous photovoltaic cells. The efficiency of a photovoltaic cell is approximately 4% which results in the required area of the cell to be a square approximately 2 mm on a side. However, it is desired for the tag to operate at night with artificial lighting of the type encountered along roadways and to accommodate misalignments and shadowing. These effects will greatly reduce the amount of power available. The output voltage of a single photovoltaic cell of the type described is on the order of 0.7 volts DC but will be less with diminished illumination. The photovoltaic cells may be connected in series and parallel and also optimized for low level illumination and low current. To allow operation of the RFID tag with less than full sunlight, and with capability to handle shadowing and non-optimum alignment, a photovoltaic cell surface area of approximately 5 centimeters square is satisfactory. Most RFID tags are approximately the size of a credit card which is sufficient in size to accommodate the photovoltaic cell. The size of RFID tags operating in the microwave bands is determined mainly by the size of the antenna. The size of the antenna is determined by the wavelength of the radio waves used for communication. A half-wavelength dipole is 16 cm long at 915 MHz. Antenna design techniques can reduce this size to some extent to form a shape such as a credit card. Thus, only a fraction of the area of the RFID tag of the present invention need be dedicated to one or more photovoltaic cells. Preferably, the photocell may be designed to also form part or all of the antenna of the RFID tag.

In accordance with the present invention, ambient solar radiation may be used, or artificial lighting. Infrared (IR), visible, or "black light" may also be used depending on the application requirements. Sufficient capacity can be provided to compensate for non-optimum alignment and attenuation due to shadowing or tinting of windshield glass.

The flexible RFID tag of the present invention may be constructed by any conventional means and may include several laminates and/or one or more windows to allow light to reach the photovoltaic cell. Light-modifying layers may be used to control tag activation, such as screening out visible light. Alternatively, infrared illumination may be provided at the site of the interrogator. It is also possible to send data by modulating the light used also to power the tag.

In accordance with the present invention, in the absence of light, it is possible to operate the tag passively using RF signals alone to interrogate and power the tag.

In accordance with the present invention, a charge storage device may also be utilized to provide the improved range in the absence of light. The charge storage device can be charged during periods that the tag is in the presence of a light source.

Control of the light source powering the tag also provides an additional method to control the zone in which the tag is responsive. That option is effective when the source of light is provided by the reader, and means to control or eliminate ambient solar radiation are employed. This is often referred to as "footprint" control.

Using frequencies in the IR, visible light, and UV spectra are desirable to provide power to the tag because the power output from these sources is unregulated, unlike UHF frequencies which are highly regulated.

A light powered tag capitalizes on all the desirable attributes of the use of RF energy harvesting and batteries of passive, semi-passive and active tags and minimizes their shortcomings while also having advantages that neither these sources of power can provide. For example, a light powered tag may be low cost, compact, long range, have virtually unlimited life, improved functionality that requires additional power such as improved rejection of interference and noise, improved encryption, high speed writing of EEPROM cells, better utilization of the power and spectrum allowed by national regulations, and improved system performance. A light powered tag has none of the drawbacks of using battery power such as limited life, increased cost, bulky packaging, limited function due to limited energy, reduced environmental performance (limits on temperature and vibration), and the environmental costs and hazards of the disposal of spent batteries.

For example, a light powered tag, if used in TTF mode can have much longer read ranges because it is not limited by the UHF downlink which is directly limited by radio regulations. The light powered tag in TTF mode also avoids another problem in achieving long read ranges with limited UHF power. If reader output power is fixed, longer read ranges can only be achieved by increasing the tag sensitivity. In a passive tag, that is difficult to do and limited by available electronics and physical laws. Inexpensive tags typically must be relatively wide bandwidth (to make them easy to manufacture). The practical result is that as manufacturers try to push up the sensitivity of inexpensive passive tags, the tags become more susceptible to jamming at the tag receiver by other UHF energy sources in the vicinity, such as cell phones or Wi-Fi hotspots. The present invention permits longer range reading of tags in a dense RF environment because a scrolling tag can be powered by the light source and reading of the tag is not limited by the ability to decode a limited power UHF signal.

The power from a light source can be used to inexpensively make the tag receiver more selective of the reader signal.

The present invention uses existing photovoltaic cell technology such as the thin-film solar cell fabricated on a flexible metallic substrate disclosed in U.S. Pat. No. 7,053,294 (Tuttle et al) and the method and apparatus for forming a thin semiconductor film disclosed in U.S. Pat. No. 7,098,085 (Yamanaka et al). The disclosures of these patents are incorporated by reference in their entirety.

Exemplary photovoltaic cell technologies suitable for use in connection with the present invention include lightweight, flexible solar panels manufactured by Clare, Inc. of Beverly Mass., under the product part number CPC 1822; thin film solar cells manufactured by PowerFilm, Inc. of Ames, Iowa under product number SP3-37; and, flexible solar panels manufactured by Silicon Solar, Inc. of Vista, Calif., under product names 3V Flexible Series, 6V Flexible Series; and 7-12V Flexible Series, etc. Using a process of manufacture called roll-to-roll, a thin film of silicon is deposited on a plastic backing, the resulting panel being light weight, durable, and flexible.

The present invention uses technology of RFID tags constructed on thin, flexible substrates as disclosed in U.S. Pat. No. 5,528,222 (Moskowitz, et al). The technology of mounting RFID tags on or encased within vehicular windshield glass is disclosed in U.S. Pat. No. 6,121,880 (Scott et al) and U.S. Pat. No. 6,275,157 (Mays et al). The disclosures of these patents are incorporated by reference in their entirety.

Figure 1:
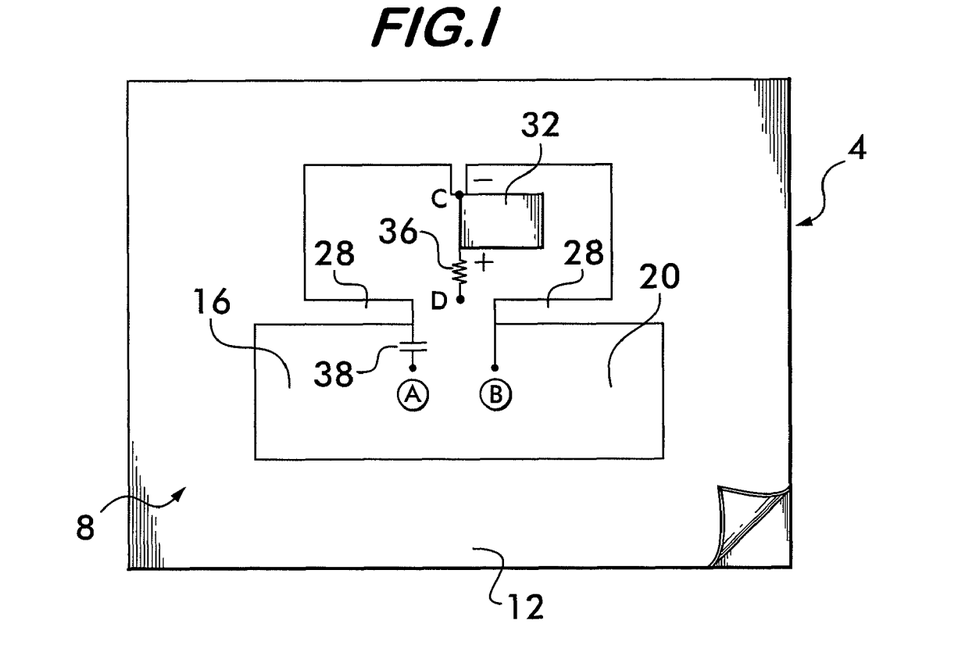
FIG. 1 is a conceptual drawing of components of a first embodiment of the light activated RFID tag of the present invention.
Figure 2:
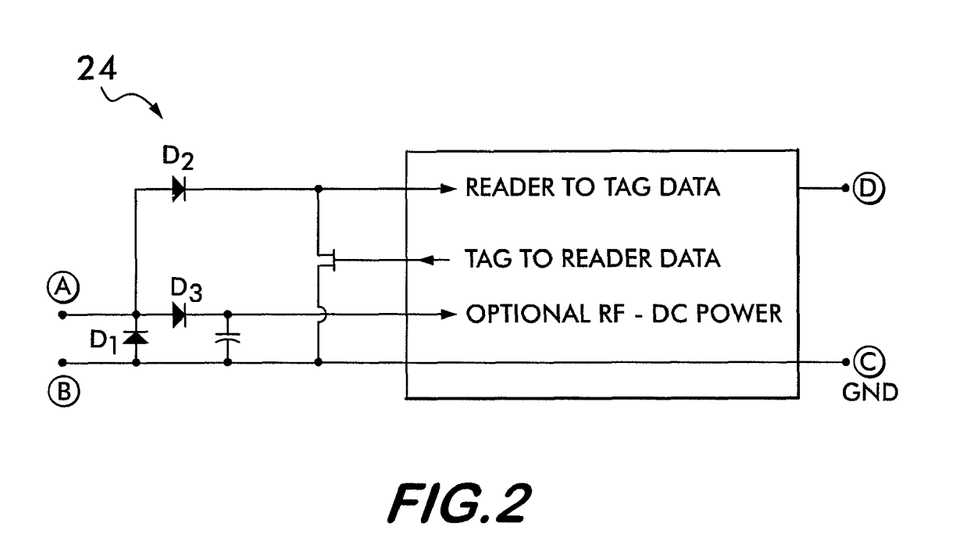
FIG. 2 is an electrical schematic diagram of the integrated circuit chip of the light activated RFID tag of FIG. 1.

Referring now in detail to the various figures of the drawings wherein like reference characters refer to like parts, there is shown in FIGS. 1 and 2, an embodiment 4 of the RFID tag of the present invention. The embodiment 4 includes an obverse side (shown) and a reverse side (not shown). During use, the obverse side is arranged to be facing a light source, either natural or artificial, so radiation from the light source may be converted to power. The embodiment 4 includes an antenna element 8 as well as one or more photovoltaic cells 32. For example if the RFID tag 4 were arranged for placement on the inside surface of a windshield of a motor vehicle, it would be attached thereto with the obverse side facing outside the vehicle to provide exposure to sunlight and to enable the transmission and receipt of RF waves to and from a tag reader (not shown).

A transparent adhesive layer (not shown) may be attached to the obverse side of the RFID tag 4 to enable attachment of the RFID tag 4 to the inside of the vehicle windshield. A decal (not shown) may be applied to the reverse side of the RFID tag. The decal may include identifying information printed thereon such as the source of the tag, vehicle information including model number, bar coded information, identifying information concerning what is programmed into the RFID tag, a logo of a particular state department of transportation or tag vendor, etc. Such identifying information facilitates the issuance of the RFID tag to the purchaser. Such a decal may be applied to the reverse side of any of the embodiments described herein. Alternatively, such a decal, only in a transparent format as opposed to an opaque format, may be provided and arranged for application to the obverse side of any of the embodiments described herein. Due to its transparency, the application of such a transparent decal to the obverse side would not interfere with exposure to sunlight or the transmission and/or reception of RF signals.

The RFID tag includes an antenna element 8 which is formed of any suitable conductive material, e.g., copper foil or tape 12. The tape 12 may adhered to a suitable flexible substrate 16 by any suitable means, e.g., gluing. the flexible substrate 16 may be made of any suitable material, e.g., several bonded layers of different thin materials, e.g., plastic such as Mylar®, Kapton®, Pyralux®, silicone etc. Alternatively, the antenna element 8 may be etched onto the flexible substrate 16 or painted thereon, e.g., conductive copper or silver paint. The obverse layer of the substrate 16 may include metallic traces or conductors 28 etched therein. The antenna element 8 includes an opening or aperture 20 which captures energy from a passing radio wave. In FIG. 1, the substrate 16 can be seen through the antenna aperture 20. Although the aperture 20 is shown in this embodiment as being a particular shape, other shaped apertures may be employed including a slot, a square, a circle, etc. The antenna aperture 20 is suitably large in size to enable the development of a sufficient RF voltage to enable the antenna 8 to act as an antenna for the transmission and reception of data.

The tape 12 of the antenna element 8 is connected to terminals A and B of an integrated circuit chip 24 (represented schematically in FIG. 2) through metallic traces or conductors 28 etched into the substrate 16. The integrated circuit chip 24 includes a memory in which data is stored and sent through the antenna element 8 to a reader (not shown). FIG. 2 is an electrical schematic diagram of the integrated circuit chip 24 of the light activated RFID tag 4.

Preferably, the integrated circuit chip 24 is an application specific integrated circuit (ASIC) chip. One such suitable ASIC is utilized in the eGo Plus Sticker Tag and is manufactured by Transcore, Inc. of Hummelstown, Pa. The integrated circuit chip 24 is attached to the substrate 16 by any suitable means, e.g., gluing, and includes terminals A, B, C and D. The integrated circuit chip 24 is connected to the antenna element 8 by connecting terminals A and B of the chip 24 to the metallic conductors 28. Also included within the aperture 20 of the antenna element 8 is the discrete photovoltaic cell 32. As best shown in FIG. 1, the photovoltaic cell 32 is connected to leads C and D of the integrated circuit 24 by any suitable means, e.g., soldering.

Referring now to FIG. 2, there is shown a circuit diagram for the integrated circuit chip 24 of the embodiment of FIG. 1. As shown in FIG. 2, terminals A and B of the integrated circuit chip 24 are provided to receive RF signals from the antenna element 8. Optionally, terminals A and B may serve as terminals for DC input. Terminal C is a ground terminal. Terminals D is an optional terminal for input of DC power to the integrated circuit chip 24 from a power source, e.g., the photovoltaic cell 32. The schematic diagram of FIG. 2 also includes lines showing the passage of data from the reader (not shown) to the integrated chip of the RFID tag 4 as well as the passage of data from the integrated chip of the RFID tag 4 to the reader (not shown). Diodes D1 and D2 are part of the detector circuit to provide data from the reader to the tag. Diode D3 prevents shorting the power supply capacitor during backscatter modulation. It is to be understood that the circuit diagram set forth in FIG. 2 is merely an exemplary circuit diagram for the integrated circuit chip 24. The internal circuitry of the integrated circuit chip 24 is known in the art. Other known internal circuitries may be utilized for the integrated circuit chip 24 and are within the scope of this invention.

Suitable resistors 36, e.g., 2K ohm resistors may be provided in series to isolate RF current from the photovoltaic cell 32 to the integrated circuit chip 24. In this manner, a photovoltaic cell 32 may be connected to the integrated circuit chip 24 where a battery would normally be utilized. Utilizing such resistors 36 to isolate the photovoltaic cell 32 from the integrated circuit chip 24 both from an RF perspective as well as through polarization prevents interference with the RF performance of the antenna element 8. Suitable capacitors 38, e.g., 220 pf capacitors, are provided to isolate the antenna element 8 from a DC perspective from the integrated circuit chip 24.

Referring again to FIG. 2, in the event the photovoltaic cell 32 is unable to provide energy to the integrated circuit chip 24, as a backup, energy may be provided to the integrated circuit chip 24 by harvesting energy from the RF signal received from the reader (not shown). As an alternative, one or more batteries (not shown) could provide power to the integrated circuit chip 24 as an augment or back-up to power provided by the photovoltaic cell 32. Under this alternative, the RFID tag 4 could include an RF transmitter for retrieving data from the memory of the integrated circuit chip 24 and modulating and sending that data through the antenna element 8. In another alternative, the RFID tag 4 could be provided with both a battery (not shown) and energy harvesting capability as back-ups in the event the photovoltaic cell 32 is temporarily unable to provide energy to the integrated circuit chip 24. In this manner, if two of the energy sources fail, a third source of energy remains available to power the integrated circuit chip 24. The electronic components shown in FIG. 2, e.g., the resistors, capacitors, diodes, etc., may be discrete components which are separate from the integrated circuit chip 24. Alternatively, these components may be integrated and made a part of the integrated circuit chip 24. Additionally, the integrated circuit chip 24 may be provided with a short term energy storage mechanism, e.g., a capacitor (not shown), to provide energy during short periods of time when the photovoltaic cell 32 is unable to produce power, such as when the photovoltaic cell 32 passes into a shadow.

In another alternative (not shown), in addition to the antenna element 8, a parasitic antenna (not shown), not having a wired input, could be provided. The parasitic antenna (not shown) is located in proximity to the active antenna element 8 and is used for controlling antenna gain, pattern, input impedance, and tuning, etc.

Figure 3:
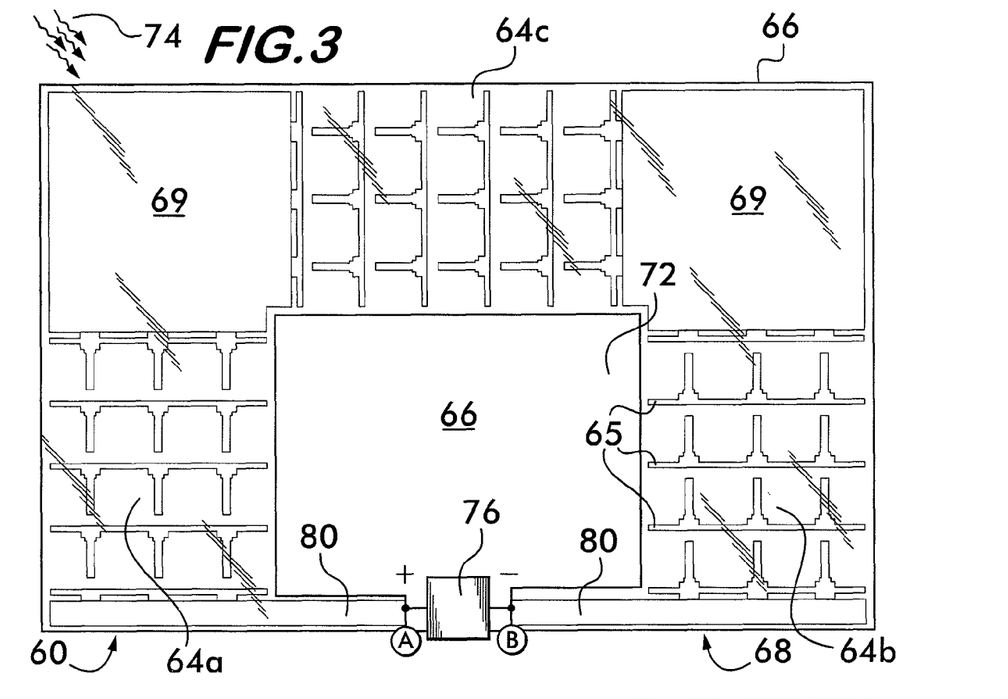
FIG. 3 is a conceptual drawing of a second embodiment of the light activated RFID tag of the present invention.
Figure 4:
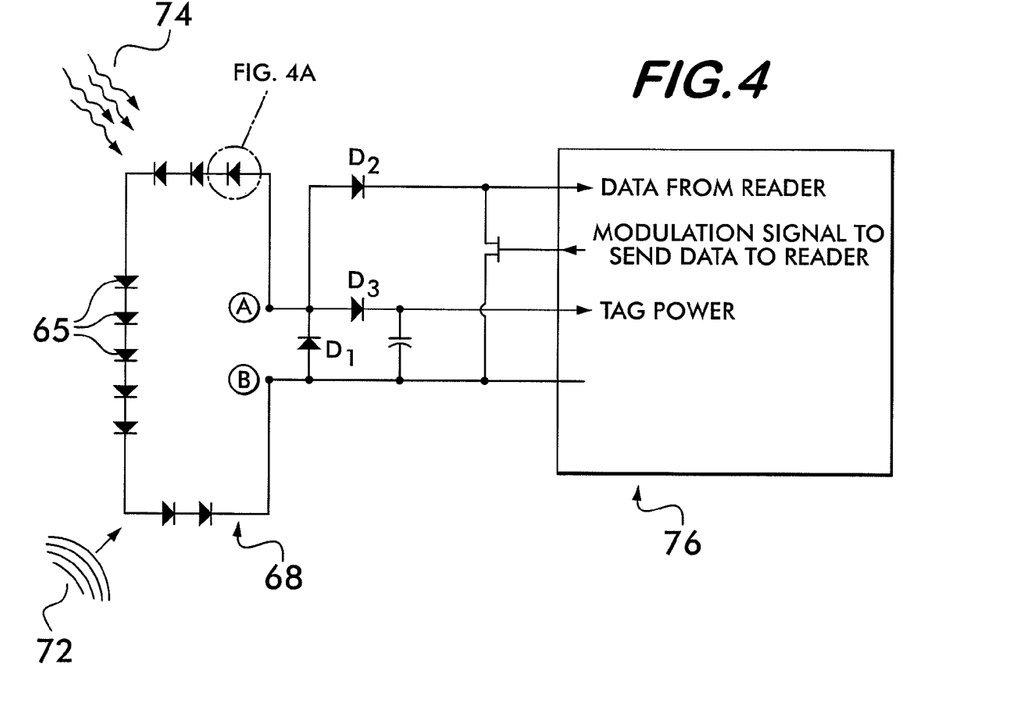
FIG. 4 is an electrical schematic diagram of the light activated RFID tag of FIG. 3.

Referring now to FIGS. 3 and 4, there is shown the obverse side of a second embodiment 60 of the light activated RFID tag of the present invention. FIG. 3 is a physical representation of several key components of the embodiment 60 while FIG. 4 is an electrical schematic diagram of the embodiment 60. Referring now to FIG. 3, the RFID tag 60 includes an aperture antenna 68 that is formed from a plurality of basically rectangular-shaped photovoltaic cell structures 64a, 64b and 64c, situated around an aperture 72. The cell structures 64a, 64b and 64c are situated on a flexible thin film substrate 66 which may be of any suitable material, e.g., several layers of different thin materials, e.g., plastics, semiconductors or thin metal foil. The flexible substrate 66 is similar in features and construction to the substrate 16 described in the embodiment 4. The substrate 66 may be viewed through the aperture 72. The cell structures 64a, 64b and 64c may be deposited directly onto the obverse side of the flexible substrate 66 during manufacture so they are integral with the substrate 66. Alternatively, if the cell structures 64a, 64b and 64c are purchased as stock items, they may be affixed to the flexible substrate 66 by any suitable means, e.g., gluing.

Figure 3A:
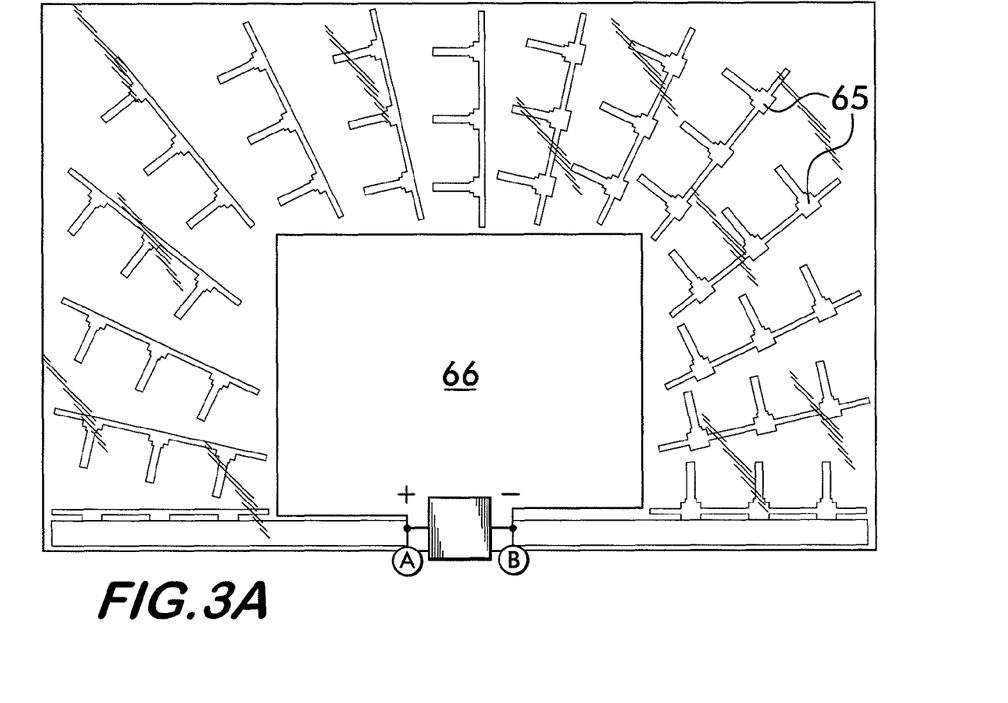
FIG. 3A is a conceptual drawing illustrating an alternative manner for arranging photovoltaic cells of the light activated RFID tag of the present invention.

Each cell structure 64a, 64b and 64c is generally rectangular in shape and includes a plurality of photovoltaic cells 65. As shown in FIG. 3, two of the cell structures 64a and 64b include four photovoltaic cells 65, while the third cell structure 64c includes five photovoltaic cells 65. Conductive material 69 is located at the upper corners of the aperture antenna 68 and is provided to connect adjacent cell structures 64a, 64b and 64c, as well as to form a portion of the aperture antenna 68. Not shown in FIG. 3, however included in this embodiment, is the transparent adhesive layer to enable attachment of the RFID tag 60 to the vehicle windshield and the decal for including include identifying information, as described previously. Referring now to FIG. 3A, as an alternative, a plurality, e.g., fourteen, non-uniformly shaped photovoltaic cells 65 may be arranged on the substrate 66 as shown therein and wired in series. The number of photovoltaic cells may differ depending on the design and intended strength of the light illumination. In this manner, the need for the conductive material 69 is eliminated. Preferably, the fourteen cells are constructed to be of uniform area. Since the voltage of a cell is fixed at approximately 0.7 volts DC maximum, the electrical current capacity of the cells are nearly identical if the area of the cells are nearly identical since the illuminating light source is of uniform intensity over the small area of the tag.

Referring again to FIG. 3, the cell structures 64a, 64b and 64c are joined together in series, as are the photovoltaic cells comprising each of the cell structures. Alternatively, the cell structures and photovoltaic cells 65 may be connected in series and/or in parallel depending upon the desired parameters for voltage and current. Each individual rectangular photovoltaic cell 65 may be of any suitable dimensions, e.g., ¼ inches wide and an inch long.

Metallic traces may be deposited onto the obverse layer of the flexible substrate 66 to form conductive elements 80 to connect the cell structures 64a, 64b and 64c to the RFID circuitry, preferably, an integrated circuit chip 76. The integrated circuit chip 76 may be physically attached to the flexible substrate 66 by any suitable means, e.g., gluing or soldering. As shown in FIGS. 3 and 4, terminal A represents the connection between the cell structures and the +DC/+RF terminal of the integrated circuit chip 76. Terminal B represents the connection between the cell structures and the –DC/–RF terminal of the integrated circuit chip 76.

Figure 4A:
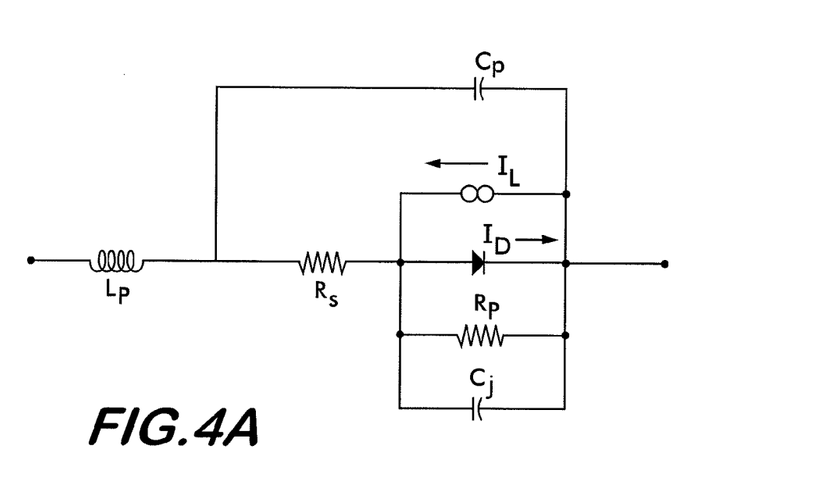
FIG. 4A is a schematic of an equivalent circuit for a photovoltaic cell as utilized in accordance with the present invention.

Individually, each photovoltaic cell 65 collects light 74 and converts that light to provide power required by the integrated circuit chip 76. As shown in FIG. 4, each discrete photovoltaic cell 65 is represented electrically by a diode, a plurality of which are arranged in series and produce approximately 7 volts of energy under full sunlight. The electrical equivalent circuit for each of the photovoltaic cells 65 shown in FIG. 4, including both DC and microwave effect is set forth in the detail of FIG. 4A. The dominant element at microwave frequencies is $C_j$, which is large due to the large surface area of the photovoltaic cells. The large value of $C_j$ results in a low impedance at microwave frequencies, so that the photovoltaic cell can be used as an antenna element.

FIG. 4 also sets forth a circuit diagram for the integrated circuit chip 76 and the manner in which the integrated circuit chip 76 and the antenna element 68 are interconnected. It should be understood that the circuit diagram of FIG. 4 is known in the art and is merely exemplary. Other known circuitries may be utilized for the integrated circuit chip 76 and are within the scope of this invention. Together, the cell structures 64a, 64b and 64c and the conductive material 69 form the antenna element 68 for sending and receiving RF signals 72 to and from a reader (not shown) to provide a communications link with the integrated circuit chip 76.

Figures 5, 6:
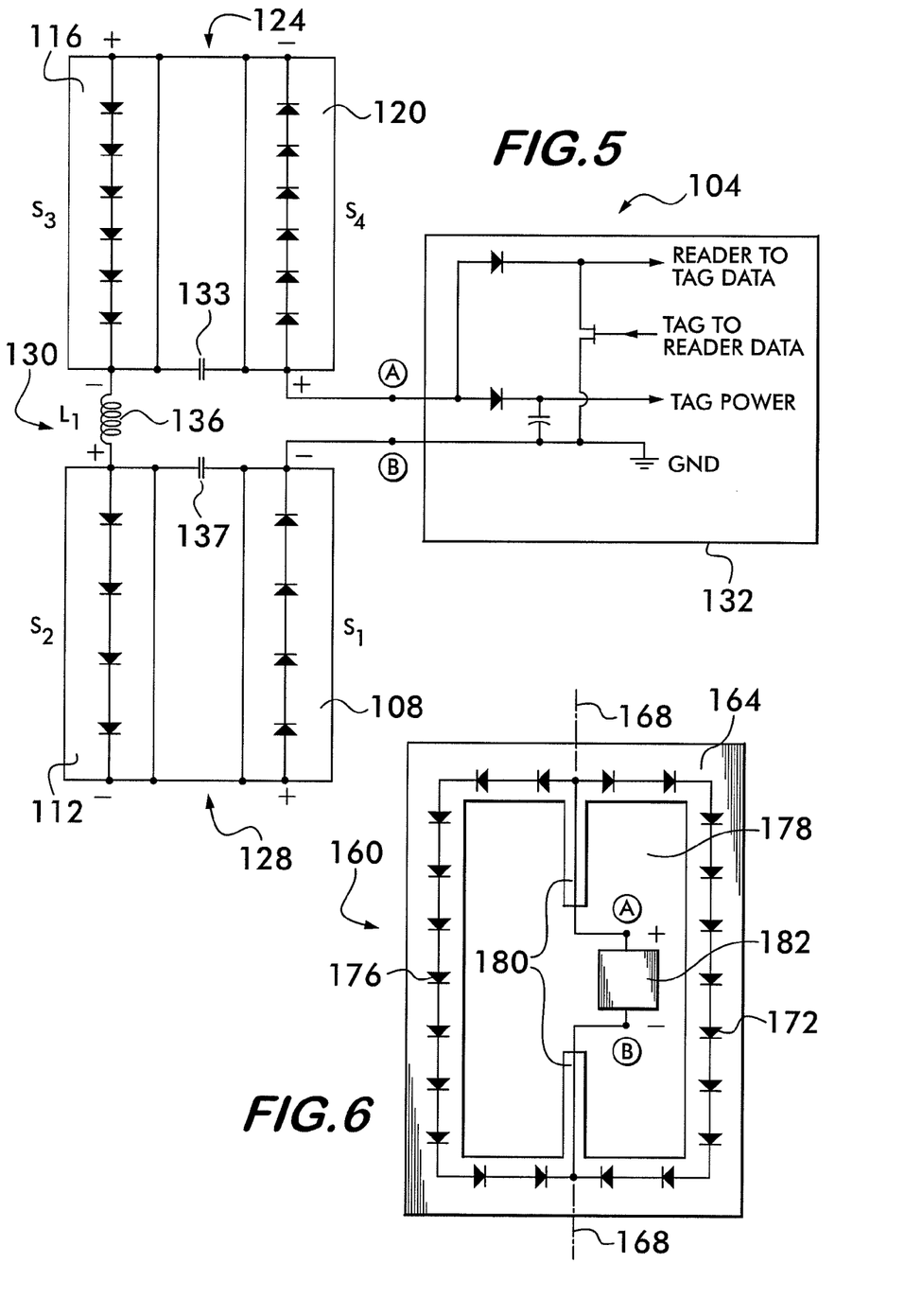
FIG. 5 is a conceptual diagram and electrical schematic diagram of components of a third embodiment of the light activated RFID tag of the present invention.
FIG. 6 is a conceptual drawing of a fourth embodiment of the light activated RFID tag of the present invention.

Referring now to FIG. 5, there is shown a conceptual drawing of a third embodiment 104 of the RFID tag of the present invention. This embodiment includes four photovoltaic cell structures, S1, S2, S3 and S4 indicated at 108, 112, 116 and 120, which are wired in series for DC power. Each of the four photovoltaic cell structures 108, 112, 116 and 120 are joined in series and each is comprised of a plurality of photovoltaic cells 122, also joined together in series. Alternatively, the cell structures 108, 112, 116 and 120 and photovoltaic cells 65 may be joined in series and/or in parallel depending upon the desired parameters for voltage and current.

The photovoltaic cell structures 108, 112, 116 and 120 are arranged to form a top paddle 124 and a bottom paddle 128 of a dipole antenna 130 for receiving and radiating RF signals to and from an integrated circuit chip 132. The cell structures 108, 112, 116, and 120 are situated on a flexible thin film substrate (not shown) similar to the substrates described in prior embodiments. The cell structures may be deposited directly onto the obverse layer of a flexible substrate, or alternatively, if the cell structures 108, 112, 116, and 120 are purchased as stock items, they may be affixed to the flexible substrate (not shown) by any suitable means, e.g., gluing.

FIG. 5 also discloses the circuit diagram for the integrated circuit chip 132 and the manner in which the integrated circuit chip 132 and the antenna element dipole antenna 130 are interconnected. It should be understood that the circuit diagram 132 of FIG. 5 is known in the art and is merely exemplary. Other known circuitries may be utilized for the integrated circuit chip 132 and are within the scope of this invention. Together, the cell structures 108, 112, 116, and 120 for the dipole antenna 130 for sending and receiving RF signals to and from a reader (not shown) to provide a communications link with the integrated circuit chip 132. An inductor L1 at 136 is provided to separate the top paddle 124 from the bottom paddle 128 at RF frequencies. Together, photovoltaic cell structures 108 and 112 act as a top paddle 124 of a dipole antenna 130 and photovoltaic cell structures 116 and 120 act as a bottom paddle 128 of the dipole antenna 130. The RFID tag 104 is provided with capacitors C1 at 133 and C2 at 137 for isolating DC current and channeling the RF signals to the integrated circuit chip 132. The inductor 136 and capacitors 133 and 137 are shown as discrete components and may be etched to the substrate (not shown). RF signals come from the dipole antenna 130 and enter the integrated circuit chip 132 at terminals A and B.

Referring now to FIG. 6, there is shown fourth embodiment 160 of the RFID tag of the present invention with an aperture antenna 164 having a geometry which is symmetric about axis indicated at 168. As shown in FIG. 6, the aperture antenna 164 is formed of a first plurality of eleven discrete photovoltaic cells 172 joined together in series and a second plurality of eleven discrete photovoltaic cells 176 joined in series. The photovoltaic cells 172 and 176 are represented as diodes in FIG. 6. The electrical equivalent for these photovoltaic cells is set forth in detail in FIG. 4A. The photovoltaic cells 172 and 176 are situated around an aperture 178 and are situated on a flexible thin film substrate (not shown), which is similar in construction to those described in the prior embodiments. As in prior embodiments, the photovoltaic cells 172 and 176 may be deposited directly onto the obverse side of the flexible substrate, or alternatively, may be affixed to the substrate by any suitable means, e.g., gluing.

The photovoltaic cells 172 and 176 are joined to metal traces or conductors 180 which are connected to terminals (indicated at A and B) of an integrated circuit chip 182. Thus, individually, the photovoltaic cells 172 and 176 each collect light and convert that light to provide power required by an integrated circuit chip 182. The photovoltaic cells arranged in series and parallel as shown in FIG. 6 produce approximately 7 volts DC of energy under full sunlight, which is more than sufficient for powering the integrated circuit chip 182. Configured in the geometry shown in FIG. 6, the aperture antenna 164 has low RF impedance across the photovoltaic cells 172 and 176 due to their high capacitance.

Figure 7:
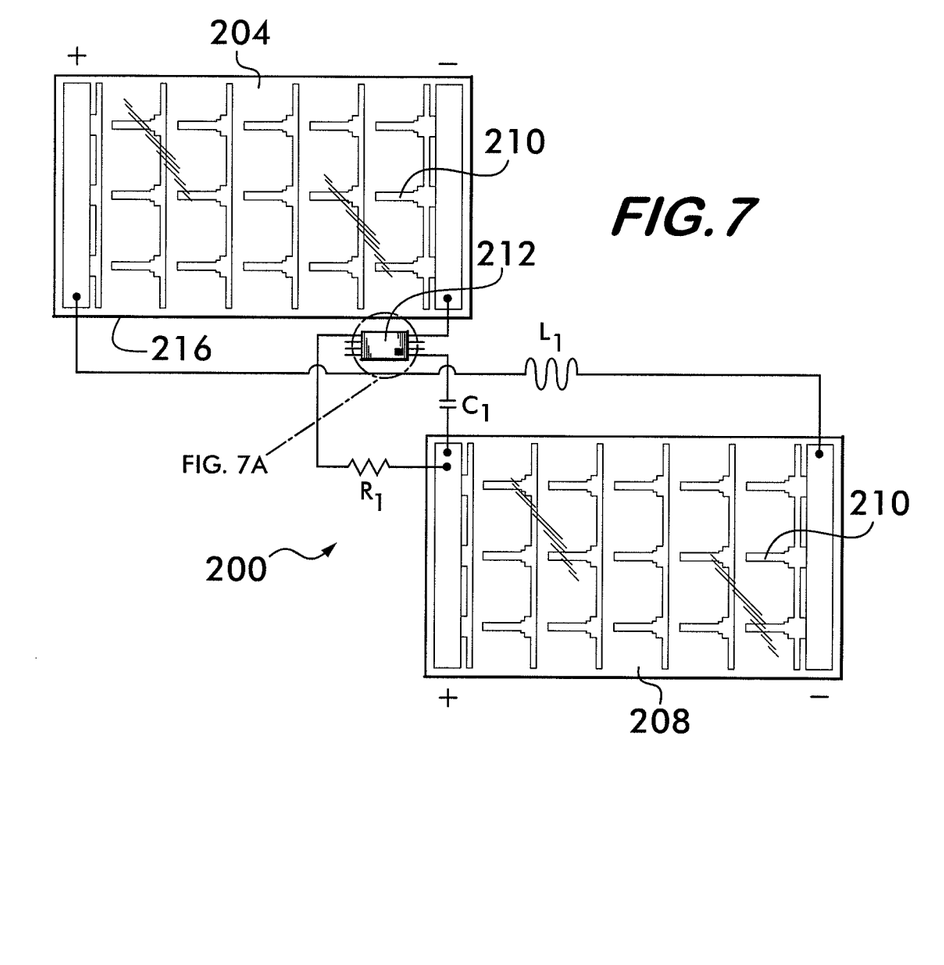
FIG. 7 is conceptual drawing of a fifth embodiment of the light activated RFID tag of the present invention.
Figure 7A:
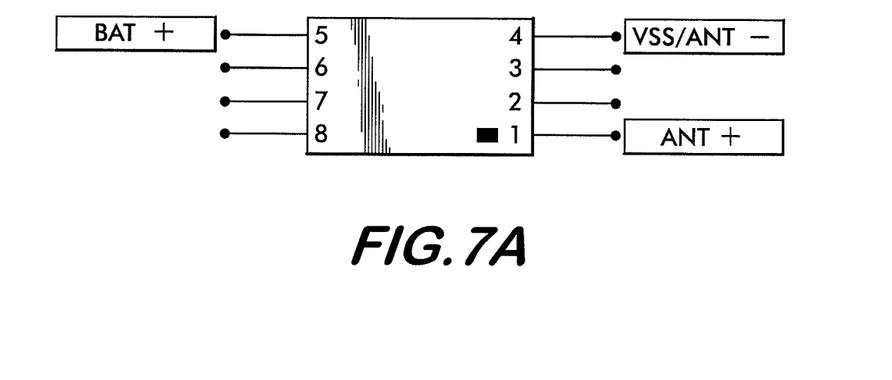
FIG. 7A is a detail view of a portion of FIG. 7.
Figure 8:
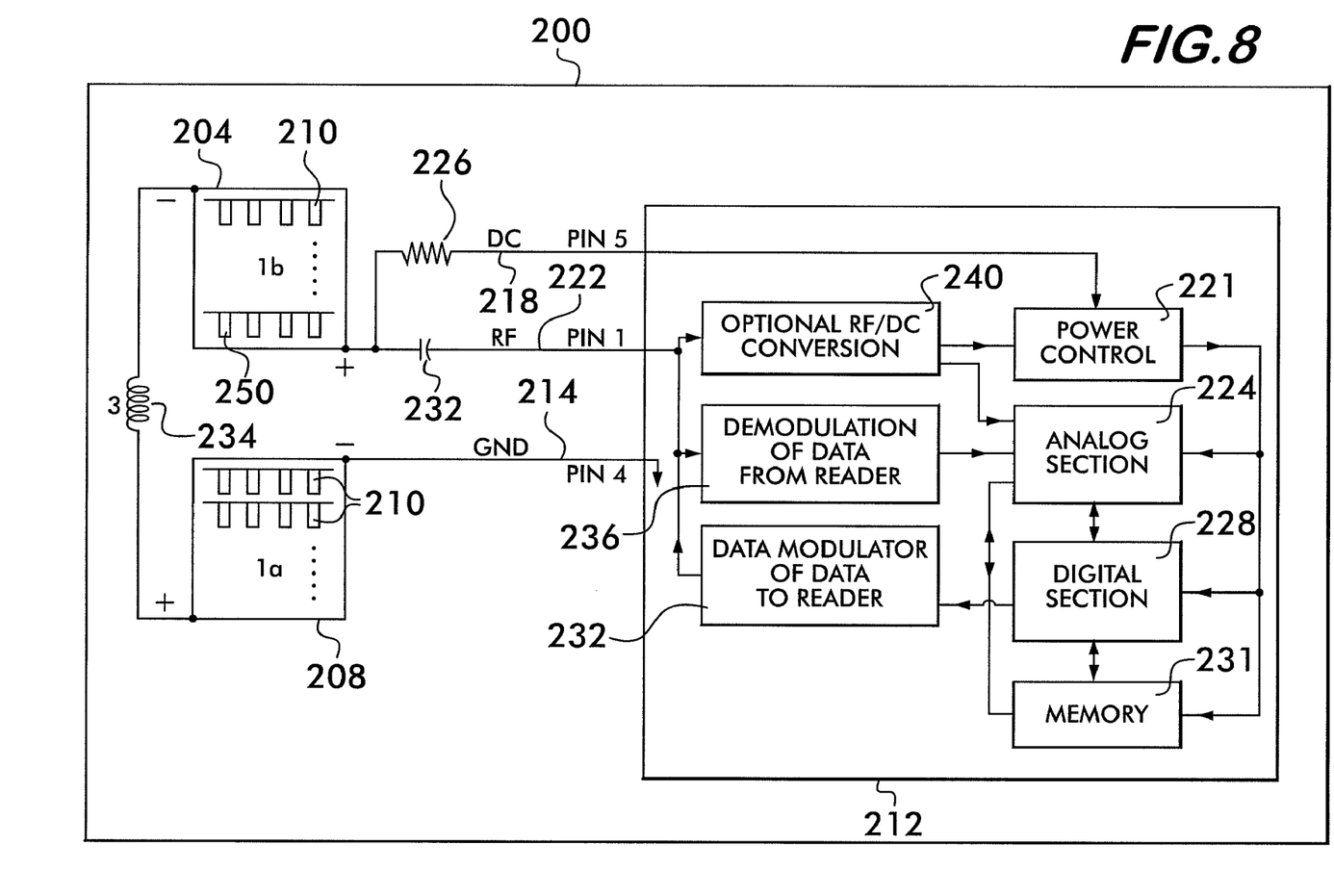
FIG. 8 is an electrical schematic diagram of the light activated RFID tag of FIG. 7.
Figures 9, 10, 11:
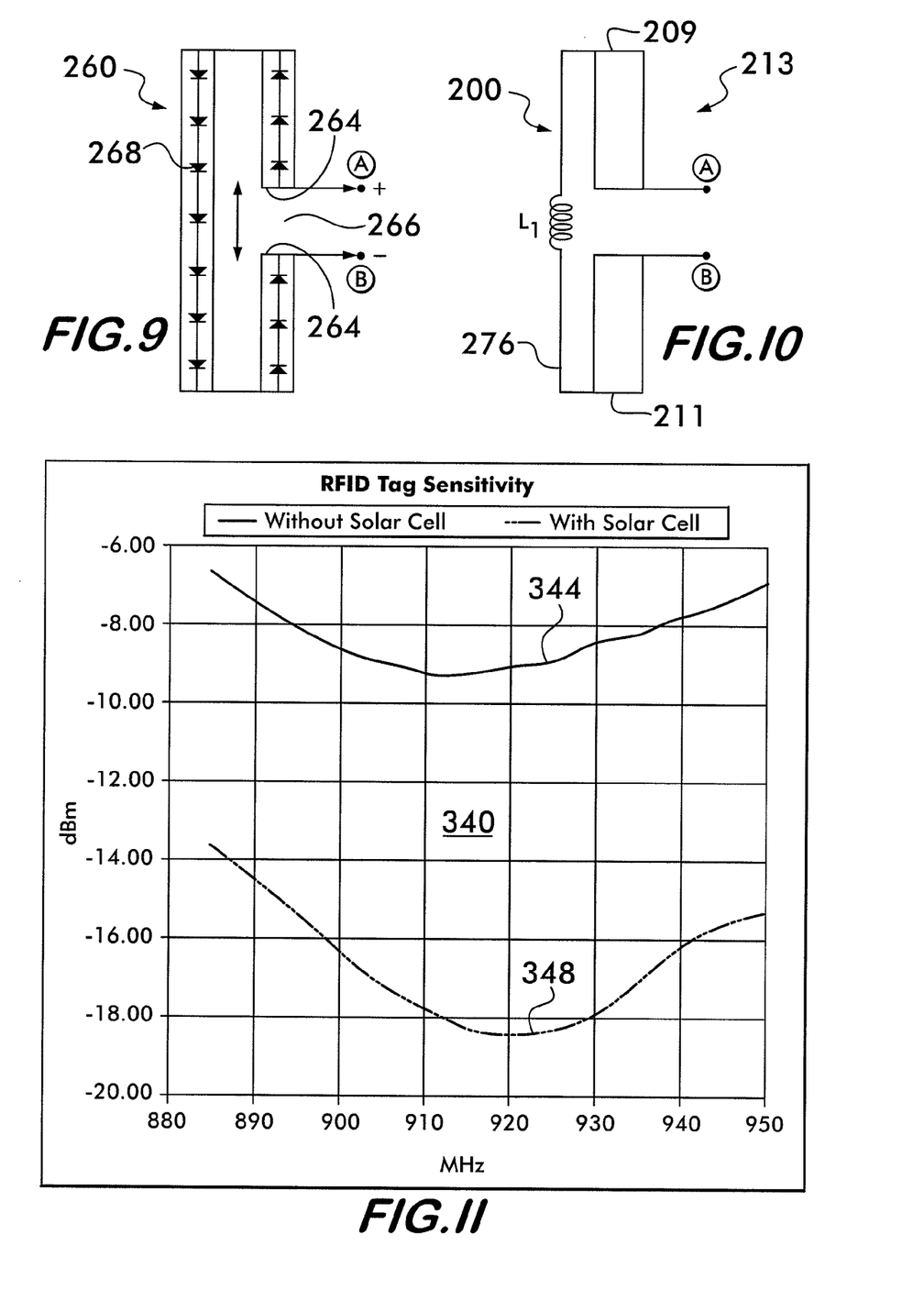

Referring now to FIGS. 7, 7A, 8, and 10, there is shown a fifth embodiment 200 of the RFID tag of the present invention. Under this embodiment, the RFID tag 200 includes two photovoltaic cell structures 204 and 208. Each cell structure includes five individual photovoltaic cells 210. The photovoltaic cell structures 204 and 208 and photovoltaic cells therein may be joined in series. Alternatively, the cell structures 204 and 208 and/or photovoltaic cells 210 therein may be joined in series and/or in parallel depending upon the desired parameters for voltage and current. The cell structures 204 and 208 may be situated on the obverse side of a flexible thin film substrate (not shown) similar to the substrates described in prior embodiments. Alternatively, if the cell structures 204 and 208 are purchased as stock items, they may be affixed to the flexible substrate (not shown) by any suitable means, e.g., gluing. Resistor R1, e.g., 3500 ohms, and capacitor C1, e.g., 33 pF, perform the same interface functions as resistor 36 and capacitor 38 of FIG. 1. Referring now to FIG. 10, the photovoltaic cell structures 204 and 208 may be arranged on a substrate (not shown) to form a first paddle 209 and a second paddle 211 of a dipole antenna 213 for receiving and radiating RF signals to and from an integrated circuit chip 212 (FIG. 7). The pins of the integrated circuit chip 212 are labeled as shown in FIG. 7A. An inductor L1, e.g., 47 nH, is provided and is connected by a wire 276 which connects to the ends of the paddles 209 and 211 and serves to prevent RF current from flowing and interfering with the operation of the RFID tag antenna 200.

As shown in FIGS. 8 and 10, the photovoltaic cell structures 204 and 208 serve the purpose of collecting and converting light to provide power required by an integrated circuit chip 212 and form the dipole antenna 213 for sending and receiving RF signals to and from a reader (not shown) to provide a communications link with the integrated circuit chip 212. As shown in FIG. 8, the RFID tag 200 includes a ground path at 214 (pin 4), a path 218 for providing external power to the integrated circuit chip 212 (pin 5), and a path 222 for receiving RF signals (pin 5). For example, RF signals could be in the form of commands from the reader (not shown). The RFID tag is provided with a resistor at 226, a capacitor at 232, and an inductor at 234. Together, these three components form an interface circuit between the photovoltaic cell structures 204 and 208 and the integrated circuit chip 212. The interface circuit divides the path for RF signals from the path for DC current and prevents DC current from interfering with RF performance.

Also set forth in FIG. 8 is the internal circuitry of the integrated circuit chip 212 which includes a power control 221, an analog section 224, a digital section 228, a memory 231, a modulator 232 to modulate data to the reader (not shown), a demodulator 236 to demodulate data from the reader (not shown), and an RF/DC converter 240, which is optional. The demodulator 236 is required only where the reader (not shown) sends data to the chip 212 and it is necessary to demodulate that data. Optionally, the chip 212 may be constructed to achieve operational power by an outside source power, e.g., one or more batteries, or by rectification of the interrogating RF signal. In accordance with the present invention, it should be understood that the chip 212 including the aforementioned components may be employed with any of the antenna designs described herein. FIG. 8 also illustrates schematically the interconnection between the integrated circuit chip 212 and the two photovoltaic cell structures 204 and 208. The internal circuitry of the integrated circuit chip 212 is known in the art. Other known internal circuitries may be utilized for the integrated circuit chip 212 and are within the scope of this invention.

Referring now to FIG. 9, there is shown therein an alternative antenna 260 for use on the light activated RFID tag of the present invention. This antenna 260, referred to as a folded-dipole antenna. The folded-dipole antenna 260 includes an opening or aperture 266 through which electromagnetic waves are sent or received. The antenna aperture 266 is suitably large in size to enable the development of a sufficient RF voltage to enable the structure to act as an antenna for the transmission and reception of data. The antenna 260 is comprised of a plurality of photovoltaic cells 268, represented by diodes, which are arranged as shown in FIG. 9. Equivalent circuitry is set forth in FIG. 4A. The antenna 260 serves the dual purpose of collecting light and converting that light to provide power required by an integrated circuit chip (not shown) and also forming an antenna 260 for sending and receiving RF signals to and from the reader (not shown) to provide a communications link with the integrated circuit chip (not shown). The photovoltaic cells 268 may be situated on the obverse side of a flexible thin film substrate (not shown) similar to the substrates described in prior embodiments. Alternatively, if the photovoltaic cells 268 are purchased as stock items, they may be affixed to the flexible substrate (not shown) by any suitable means, e.g., gluing. The photovoltaic cells 268 are connected to terminals A and B of a known integrated circuit chip (not shown) by any suitable means, e.g., soldering.

Referring now to FIG. 11, there is shown a graph 340. The upper curve 344 of the graph 340 illustrates the sensitivity of a known RFID tag that is passive and relies entirely on the reader to derive its power through RF energy harvesting. The lower curve 348 of the graph 340 illustrates the sensitivity of an RFID tag made in accordance with the present invention wherein power is provided by one or more photovoltaic cells. As demonstrated in the graph 340, due to the inclusion of the photovoltaic cells, the RFID tag of the present invention (indicated at 348) has greater sensitivity than the known passive RFID tag (indicated at 344) and thus, operates with less power and has an increased effective operating range.

What is claimed:

1. A radio frequency identification device (RFID) arranged for use with a remote interrogator unit, said RFID device comprising:
   a. an integrated circuit configured to send, in response to a signal received from a remote interrogator unit, a responsive signal which includes identification information; and,
   b. an array of photovoltaic cells serving as a power supply by converting light radiation into electrical energy and supplying power to the integrated circuit, said array of photovoltaic cells being arranged in a geometry to serve as a communication antenna electrically coupled to said integrated circuit to provide for wireless communication with the remote interrogator unit.

2. The RFID device of claim 1, wherein said integrated circuit includes a memory arranged for storing for retrieval therefrom said identification information.

3. The RFID device of claim 1, wherein said integrated circuit includes a memory that is read/write to enable writing identification information to the RFID device and reading said identification information from said RFID device.

4. The RFID device of claim 1, wherein said device is arranged for attachment to the windshield of a vehicle.

5. The RFID device of claim 1, further comprising a flexible substrate having an obverse surface, said array of photovoltaic cells being deposited on said obverse surface of said flexible substrate.

6. The RFID device of claim 1, wherein said array of photovoltaic cells is in the form of an aperture antenna.

7. The RFID device of claim 1, wherein said array of photovoltaic cells is in the form of a dipole antenna.

8. The RFID device of claim 1, wherein said array of photovoltaic cells is in the form of a folded dipole antenna.

9. The RFID device of claim 1, wherein said device further comprises a backup power supply arranged to receive the signal from the remote interrogator and use energy rectified from the signal to send a signal back to the remote interrogator unit.

10. The RFID device of claim 1, wherein said device further comprises a backup power supply comprising a battery.

11. The RFID device of claim 1, wherein said device is arranged for attachment to an item needing to be tracked.

12. The RFID device of claim 11, wherein said item is a vehicle.

13. The RFID device of claim 1, wherein said integrated circuit comprises a semiconductor chip.

14. The RFID device of claim 1, wherein said light radiation is artificial light.

15. The RFID device of claim 1, wherein said light radiation is infrared light.

16. The RFID device of claim 1, wherein said light radiation is visible light.

17. The RFID device of claim 1, wherein said light radiation is black light.

18. The RFID device of claim 1, wherein said light radiation is solar radiation.

19. The RFID device of claim 1, wherein said array of photovoltaic cells are arranged in series.

20. The RFID device of claim 1, wherein said array of photovoltaic cells are situated about at least one aperture.

21. The RFID device of claim 20, wherein each photovoltaic cell structure generates approximately 7 volts of energy under full sunlight.

22. The RFID device of claim 1, said RFID device being approximately the size of a credit card.

23. The RFID device of claim 1, wherein said RFID device is adapted to be affixed to a glass surface.

24. The RFID device of claim 1, wherein said RFID device comprises a passive RFID tag.

25. The RFID device of claim 1, wherein said RFID device comprises an active RFID tag.

26. The RFID device of claim 1, wherein said RFID device comprises a semi-passive RFID tag.

27. The RFID device of claim 1, wherein communication between said RFID device and the remote interrogator unit is initiated utilizing TTF protocol.

28. The RFID device of claim 1, wherein communication between said RFID device and the remote interrogator unit is initiated utilizing RTF protocol.

29. A system for tracking a plurality of movable objects, the system comprising:
   a. at least one movable object to be tracked;
   b. a radio frequency identification (RFID) device coupled to the moving object;
   c. a remote interrogator unit arranged for use with said RFID device; and,
   d. said RFID device being configured to identify said at least one moveable object and to store identification information associated with said at least one moveable object, said RFID device comprising an integrated circuit configured to send, in response to a signal received from said remote interrogator unit, a responsive signal which includes said identification information, said RFID device further comprising an array of photovoltaic cells serving as a power supply by converting light radiation into electrical energy and supplying power to the integrated circuit, said array of photovoltaic cells being arranged in a geometry to serve as a communication antenna electrically coupled to said integrated circuit to provide for wireless communication with the remote interrogator unit.

* * * * *